United States Patent
Yamane et al.

(10) Patent No.: US 9,518,154 B2
(45) Date of Patent: Dec. 13, 2016

(54) FLUORINE-CONTAINING SURFACE TREATMENT AGENT AND AN ARTICLE TREATED WITH THE SAME

(71) Applicant: SHIN-ETSU CHEMICAL CO., LTD., Tokyo (JP)

(72) Inventors: Yuji Yamane, Annaka-shi (JP); Noriyuki Koike, Annaka-shi (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 359 days.

(21) Appl. No.: 14/304,152

(22) Filed: Jun. 13, 2014

(65) Prior Publication Data

US 2015/0004419 A1    Jan. 1, 2015

(30) Foreign Application Priority Data

Jul. 1, 2013  (JP) ................. 2013-138249

(51) Int. Cl.
| | | |
|---|---|---|
| *C08G 77/24* | (2006.01) | |
| *C09D 183/14* | (2006.01) | |
| *C09D 7/00* | (2006.01) | |
| *C09D 183/08* | (2006.01) | |
| *C08G 77/52* | (2006.01) | |
| *C08K 5/03* | (2006.01) | |
| *C08G 77/46* | (2006.01) | |

(52) U.S. Cl.
CPC ............ *C08G 77/24* (2013.01); *C09D 7/001* (2013.01); *C09D 183/08* (2013.01); *C09D 183/14* (2013.01); *C08G 77/46* (2013.01); *C08G 77/52* (2013.01); *C08K 5/03* (2013.01); *Y10T 428/31612* (2015.04); *Y10T 428/31663* (2015.04)

(58) Field of Classification Search
CPC ......... C08G 77/24; C08G 77/46; C08G 77/52; C09D 183/08; C09D 183/14; C09D 7/001; C08K 5/03; Y10T 428/31612; Y10T 428/31663

USPC ......... 428/421, 429, 447; 524/795, 858, 860
See application file for complete search history.

(56) References Cited

U.S. PATENT DOCUMENTS

| | | | |
|---|---|---|---|
| 2011/0098402 A1* | 4/2011 | Yamane ............... | C08G 65/007 524/521 |
| 2012/0077041 A1 | 3/2012 | Yamane et al. | |
| 2012/0270057 A1 | 10/2012 | Yamane et al. | |

FOREIGN PATENT DOCUMENTS

| | | |
|---|---|---|
| JP | A-2011-116947 | 6/2011 |
| JP | A-2012-72272 | 4/2012 |
| JP | A-2012-233157 | 11/2012 |

* cited by examiner

*Primary Examiner* — Ling Choi
*Assistant Examiner* — Chun-Cheng Wang
(74) *Attorney, Agent, or Firm* — Oliff PLC

(57) ABSTRACT

The invention provides a surface treatment agent wherein a fluorooxyalkylene group-containing polymer or a fluorooxyalkylene group-containing polymer composition comprising the polymers, which is controlled of a temperature range of vaporization of fluorooxyalkylene group-containing polymer(s). The fluorooxyalkylene group-containing polymer has a fluorooxyalkylene structure represented by —(OCF2)p(OCF2CF2)q— and hydrolysable groups bond to a silicon atom represented by the formula at least one terminal. The polymer composition shows a decrease of 75% or more in weight, relative to the total weight of the polymer, in a temperature range of from 150 to 350 degrees C. when this is heated at a rate of 2 degrees C. per minute and a pressure of 0.1 Pa or less. The present surface treatment agent forms a coating having water- and oil-repellency and scratch resistance regardless of a vapor deposition conditions, in particularly by a vapor deposition at a mild temperature such as 350 degrees C.

19 Claims, No Drawings

FLUORINE-CONTAINING SURFACE TREATMENT AGENT AND AN ARTICLE TREATED WITH THE SAME

This application claims the benefits of Japanese Patent application No. 2013-138249 filed on Jul. 1, 2013, the contents of which are hereby incorporated by reference.

FIELD OF THE INVENTION

The present invention relates to a fluorine-containing surface treatment agent and an article treated with the agent.

BACKGROUND OF THE INVENTION

Compounds containing a perfluorooxyalkylene moiety generally have a very small surface free energy and, accordingly, have good water- and oil-repellency, chemical resistance, lubricity, a releasing property, and an antifouling property. Taking advantage of these properties, they are widely used as, for example, water- and oil-repellent agents or antifouling agents for paper and fiber, lubricants for magnetic storage media, oil-repellent components for precision apparatuses, releasing agents, cosmetics, and protective coatings. Recently, there is an increasing need for technology to attain fingerprint proofness or easy removal of fouling on a surface of a display for better appearance or visibility. Perfluorooxyalkylene compounds are used as a material to meet these requirements. In particular, perfluoropolyethers comprising ($CF_2O$) units are preferable because of their good lubricity. For instance, FOMBLIN Z type [$(CF_2O)_p(CF_2CF_2O)_q$] is commercialized. However, FOMBLIN Z type has wide molecular weight distribution, so that a polymer synthesized from the FOMBLIN Z type perfluoropolyether has a wide temperature range of vaporization. Therefore, there is a problem such that properties of a coating vary depending on vacuum deposition conditions. Further, it is difficult to control a degree of vacuum and a temperature rise rate of a surface treatment agent, so that properties of a coating vary among batches even when the same apparatus is used.

Japanese Patent Application Laid-Open Nos. 2011-116947, 2012-233157 and 2012-72272, hereinafter called Patent Literatures 1 to 3, discloses surface treatment agents comprising a composition which comprises a mixture of a fluorooxyalkylene group-containing polymer whose main chain is —$(OC_2F_4)_e(OCF_2)_fO$— and which has a hydrolysable group at one terminal, and a fluorooxyalkylene group-containing polymer having hydrolysable groups at the both terminals, wherein an amount of the fluorooxyalkylene group-containing polymer having hydrolysable groups at the both terminals is specified. Patent Literatures 1 to 3 also describe that the surface treatment agents can form a water- and oil-repellent layer having excellent scratch resistance and a lower dynamic friction coefficient.

Patent Literature 1: Japanese Patent Application Laid-Open No. 2011-116947
Patent Literature 2: Japanese Patent Application Laid-Open No. 2012-233157
Patent Literature 3: Japanese Patent Application Laid-Open No. 2012-72272

SUMMARY OF THE INVENTION

Problems to be Solved by the Invention

However, when the surface treatment agents described in Patent Literatures 1 to 3 are applied on a surface of a substrate by vapor deposition, a coating sometimes has poor water- and oil-repellency and scratch resistance, depending on deposition conditions. Further, the surface treatment agents in Patent Literatures 1 to 3 are vapor deposited in vacuum at a so high temperature as 740 degrees C. Then, the temperature rises quickly, so that the surface treatment agent occurs a flash boiling and a coating obtained tends to be uneven. Therefore, it is preferred to carry out the vapor deposition gradually at a mild temperature such as 350 degrees C so as to form an even coating. However, when the surface treatment agents described in Patent Literatures 1 to 3 are subjected to vapor deposition at a mild temperature such as 350 degrees C, a scrub resistance against steel wool of a coating obtained is poor.

The purpose of the present invention is to provide a surface treatment agent which stably forms a coating having good water- and oil-repellency and scratch resistance, regardless of vapor deposition conditions, in particular by a vapor deposition at a mild temperature.

Means to Solve the Problems

The present inventors have made research and found that control of a temperature range of vaporization of fluorooxyalkylene group-containing polymer(s) comprised in a surface treatment agent stably attains a formation of a coating having good water- and oil-repellency and scratch resistance, regardless of vapor deposition conditions, in particular by vapor deposition in mild temperature conditions such as 350 degrees C.

Thus, the present invention provides a surface treatment agent comprising a fluorooxyalkylene group-containing polymer and/or a product obtained by partial hydrolysis and condensation of the polymer, wherein the fluorooxyalkylene group-containing polymer has a fluorooxyalkylene structure represented by —$(OCF_2)_p(OCF_2CF_2)_q$—;
  wherein p and q are, independently of each other, an integer of from 5 to 80 and a total of p and q is 10 to 100, and these parenthesized units may be sequenced at random; and
at least one group represented by the following formula (1) at at least one terminal;

(1)

wherein R is an alkyl group having 1 to 4 carbon atoms or a phenyl group, X is a hydrolysable group, a is 2 or 3, and c is an integer of from 1 to 10;
and shows a decrease of 75% or more in weight, relative to the total weight of the polymer, in a temperature range of from 150 to 350 degrees C when heated at a rate of 2 degrees C per minute and a pressure of 0.1 Pa or less.

Further, the present invention provides a surface treatment agent comprising a fluorooxyalkylene group-containing polymer composition, wherein the composition comprises a fluorooxyalkylene group-containing polymer having
  a fluorooxyalkylene structure represented by —$(OCF_2)_p(OCF_2CF_2)_q$—;
    wherein p and q are, independently of each other, an integer of from 5 to 80 and a total of p and q is 10 to 100, and these parenthesized units may be sequenced at random; and
  at least one group represented by the following formula (1) at least one terminal;

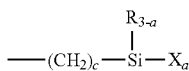 (1)

wherein R is an alkyl group having 1 to 4 carbon atoms or a phenyl group, X is a hydrolysable group, a is 2 or 3, and c is an integer of from 1 to 10; and/or
a product obtained by partial hydrolysis and condensation of said polymer; and
an another polymer represented by the following formula (3):

A-Rf-A (3)

wherein Rf is $-(CF_2)_d-(OCF_2)_p(OCF_2CF_2)_q(OCF_2CF_2CF_2)_r(OCF_2CF_2CF_2CF_2)_s-O(CF_2)_d-$,  d is an integer of from 0 to 5, p and q are, independently of each other, an integer of from 5 to 80, r and s are, independently of each other, an integer of from 0 to 80, and a total of p, q, r and s is 10 to 100, A is a fluorine atom, a hydrogen atom, or a monovalent fluorinated group having a $-CF_3$ group or a $-CF_2H$ group at a terminal, and these parenthesized units may be sequenced at random, and shows a decrease of 75% or more in weight, relative to the total weight of the polymer composition, in a temperature range of from 150 to 350 degrees C when heated at a rate of 2 degrees C per minute and a pressure of 0.1 Pa or less.

Further, the present invention provides a method for preparing the surface treatment agent, wherein the method comprises a step of subjecting a fluorooxyalkylene group-containing polymer composition comprising a fluorooxyalkylene group-containing polymer having at least one group represented by said formula (1) and/or a product obtained by partial hydrolysis and condensation of said polymer, and a polymer represented by said formula (3) to molecular distillation at a temperature in a range from 100 to 400 degrees C to thereby remove low boiling components and/or high boiling components.

Effects of the Invention

The surface treatment agent of the present invention stably forms a coating having good water- and oil-repellency and scratch resistance regardless of vapor deposition conditions, in particular by vapor deposition at a mild temperature such as 350 degrees C.

BEST MODES OF THE INVENTION

The present invention will be described below in detail.
One of the characteristics of the present invention is that the fluorooxyalkylene group-containing polymer or the fluorooxyalkylene group-containing polymer composition has molecular weight distribution such that when the polymer is heated at a rate of 2 degrees C per minute and a pressure of 0.1 Pa or less, the polymer shows a decrease of 75% or more in weight, relative to the total weight of the polymer or the composition, which means 75% or more of the polymer vaporizes, in a temperature range of from 150 to 350 degrees C. Preferably, the decrease in weight is 80% or more, particularly 90% or more, relative to the total weight of the polymer or the composition, in the temperature range of from 150 to 350 degrees C.

On account of the fact that the polymer or the composition comprised in the surface treatment agent has the aforesaid decrease in weight, the coating stably has a high quality water- and oil-repellent layer, regardless of vapor deposition conditions. If a large amount of lower molecular weight components having a vaporization temperature of lower than 150 degrees C are contained in a surface treatment agent, a coating obtained has a poor scrub resistance against steel wool. If a large amount of higher molecular weight components having a vaporization temperature of higher than 350 degrees C are contained in a surface treatment agent, it is difficult to conduct vapor deposition of a surface treatment agent at a mild temperature, such as 350 degrees C, and a longer time is required and, therefore, the terminal groups of the polymer may decompose.

To determine the decrease in weight, the polymer or the composition is heated at a rate of 2 degrees C per minute and a pressure of 0.1 Pa or less. The polymer may be subjected to a thermogravimetry in vacuum such as $1.0 \times 10^{-3}$ to $9.0 \times 10^{-2}$ Pa and temperatures of from 25 up to 500 degrees C. Any known apparatus may be used and not limited to any particular one. For instance, a saturation vapor pressure evaluation system VPE-9000SP, ex ULVAC-RIKO, Inc. can be used.

The first aspect of the present invention provides a surface treatment agent comprising a fluorooxyalkylene group-containing polymer and/or a product obtained by partial hydrolysis and condensation of the polymer. The fluorooxyalkylene group-containing polymer has a fluorooxyalkylene structure represented by $-(OCF_2)_p(OCF_2CF_2)_q-$
wherein p and q are, independently of each other, an integer of from 5 to 80 and a total of p and q is 10 to 100, and these parenthesized units may be sequenced at random; and has
at least one group represented by the following formula (1) at at least one terminal;

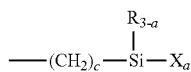 (1)

wherein R is an alkyl group having 1 to 4 carbon atoms or a phenyl group, X is a hydrolysable group, a is 2 or 3, and c is an integer of from 1 to 10.

The first aspect of the present invention is characterized in that when the fluorooxyalkylene group-containing polymer is heated at a rate of 2 degrees C per minute and a pressure of 0.1 Pa or less, the polymer shows a decrease of 75% or more, preferably 80% or more, further preferably 90% or more, in weight, relative to the total weight of the polymer, in a temperature range of from 150 to 350 degrees C. On account of this characteristic, the present surface treatment agent forms a coating having good water- and oil-repellency and scratch resistance. The polymer having molecular weight distribution to give the aforesaid decrease in weight is prepared by rectification or molecular distillation of a polymer. In particular, the molecular distillation is preferred in view of heating process. The manner of the molecular distillation will be explained below.

The fluorooxyalkylene group-containing polymer is particularly represented by the following formula (a):

$A^o\text{-}Rf^o\text{--}B^o$ 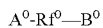 (a)

wherein $Rf^o$ is a divalent linear fluorooxyalkylene group having 5 to 200, preferable 10 to 100, further preferably 10 to 80, more preferably 20 to 60, $-OC_kF_{2k}-$ repeating units, wherein k is an integer of from 1 to 6, provided that the number of $(OCF_2)$ units is 5 to 80, the number of $(OCF_2CF_2)$ units is 5 to 80, and the total number of (OCF$_2$) and (OCF$_2$CF$_2$) units is 10 to 100. A$^0$ and B$^0$ are, independently of each other, the following Rf$^1$ or the group represented by the formula (1).

In the formula (a), Rf$^1$ is a fluorine atom, a hydrogen atom, or a monovalent fluorinated group having a —CF$_3$ group or a —CF$_2$H group at a terminal, provided that at least one of A$^0$ and B$^0$ is the group represented by the formula (1). Rf$^0$ is particularly a fluorooxyalkylene group represented by —(CF$_2$)$_d$—(OCF$_2$)$_p$(OCF$_2$CF$_2$)$_q$(OCF$_2$CF$_2$CF$_2$)$_r$(OCF$_2$CF$_2$CF$_2$)$_s$—O(CF)$_d$—, wherein d is an integer of from 0 to 5, p and q are, independently of each other, an integer of from 5 to 80, r and s are, independently of each other, an integer of from 0 to 80 and a total of p, q, r and s is 10 to 100, and these parenthesized units may be sequenced at random.

The fluorooxyalkylene group-containing polymer may have the group represented by the aforesaid formula (1) at one terminal (that is, one of A$^0$ and B$^0$ is the group represented by the formula (1) and the other is a Rf$^1$ group, hereinafter called "one-terminal hydrolysable polymer"), or at the both terminals (that is, both of A$^0$ and B$^0$ are the group represented by the formula (1), hereinafter called "both-terminal hydrolysable polymer"). The polymer may be a mixture of the one-terminal hydrolysable polymer and the both-terminal hydrolysable polymer. When the polymer is the mixture, the mixing ratio is not limited to any particular one, as long as the mixture has molecular weight distribution such that when the mixture is heated at a rate of 2 degrees C per minute and a pressure of 0.1 Pa or less, the mixture shows a decrease of 75% or more, preferably 80% or more, further preferably 90% or more, in weight, relative to the total weight of the mixture, in a temperature range of from 150 to 350 degrees C. The one-terminal hydrolysable polymer is particularly preferred.

The one-terminal hydrolysable polymer is represented by the following formula (2):

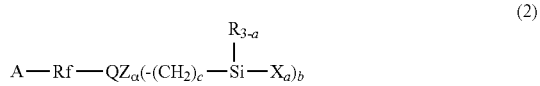

(2)

wherein Rf is —(CF$_2$)$_d$—(OCF$_2$)$_p$(OCF$_2$CF$_2$)$_q$(OCF$_2$CF$_2$CF$_2$)$_r$(OCF$_2$CF$_2$CF$_2$CF$_2$)$_s$—O(CF$_2$)$_d$—, A is a fluorine atom, a hydrogen atom, or a monovalent fluorinated group having a —CF$_3$ group or a —CF$_2$H group at a terminal, Q is a divalent organic group, Z is a divalent to octavalent organopolysiloxane residue having siloxane bonds, R is an alkyl group having 1 to 4 carbon atoms or a phenyl group, X is a hydrolysable group, a is 2 or 3, b is an integer of from 1 to 7, c is an integer of from 1 to 10, a is 0 or 1, d is an integer of from 0 to 5, p and q are, independently of each other, an integer of from 5 to 80, r and s are, independently of each other, an integer of from 0 to 80, and a total of p, q, r and s is 10 to 100, and these parenthesized units may be sequenced at random.

The both-terminal hydrolysable polymer is represented by the following formula (4):

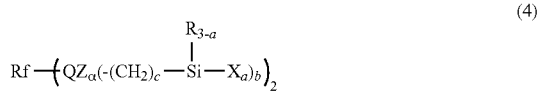

(4)

wherein Rf is —(CF$_2$)$_d$—(OCF$_2$)$_p$(OCF$_2$CF$_2$)$_q$(OCF$_2$CF$_2$CF$_2$)$_r$(OCF$_2$CF$_2$CF$_2$CF$_2$)$_s$—O(CF$_2$)$_d$—, and Q, Z, R, X, a, b, c, d, a, p, q, r and s are as defined for the formula (2).

In the afore-mentioned formulas, p and q are, independently of each other, preferably an integer of from 10 to 60, further preferably 20 to 50, r and s are, independently of each other, preferably an integer of from 0 to 20, further preferably 0 to 10, and a total of p, q, r and s is preferably 10 to 80, further preferably 20 to 60, provided that the p, q, r and s are a number such that the polymer has molecular weight such that when the polymer is heated at a rate of 2 degrees C per minute and a pressure of 0.1 Pa or less, the polymer shows a decrease of 75% or more, preferably 80% or more, further preferably 90% or more, in weight, relative to the total weight of the polymer, in a temperature range of from 150 to 350 degrees C.

In the afore-mentioned formula, A is a fluorine atom, a hydrogen atom, or a monovalent fluorinated group having a —CF$_3$ group or —CF$_2$H group at a terminal, preferably a fluoroalkyl group having 1 to 6 carbon atoms. The terminal is preferably a —OCF$_3$ group or —OCF$_2$H group.

In the afore-mentioned formulas, X is, independently of each other, a hydrolysable group. Examples of X include alkoxy groups having 1 to 10 carbon atoms such as methoxy, ethoxy, propoxy and buthoxy groups; oxyalkoxy groups having 2 to 10 carbon atoms such as methoxymethoxy and methoxyethoxy groups; acyloxy groups having 1 to 10 carbon atoms such as an acetoxy group; alkenyloxy groups having 2 to 10 carbon atoms such as an isopropenoxy group; and halogen atoms such as chlorine, bromine, and iodine atoms. Among these, methoxy, ethoxy, isopropenoxy groups and a chlorine atom are preferred.

In the afore-mentioned formulas, R is an alkyl group having 1 to 4 carbon atoms and a phenyl group. Among these, a methyl group is preferred. "a" is 2 or 3, preferably 3 in view of reactivity and adhesiveness to a substrate. "b" is an integer of from 1 to 7, preferably 1 to 3, and "c" is an integer of from 1 to 5, preferably 1 to 3.

In the afore-mentioned formulas, Q is a divalent organic group to link Rf with Z, or Rf with the (CH$_2$)$_c$ group. Preferred are organic groups with have 2 to 12 carbon atoms and may have one or more bonds selected from an amide bond, an ether bond, an ester bond and a vinyl bond, more preferably substituted or unsubstituted hydrocarbon groups with have 2 to 12 carbon atoms and may have aforesaid bond. Examples of Q include the following;

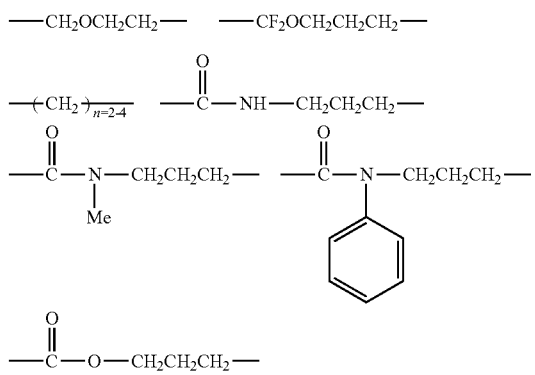

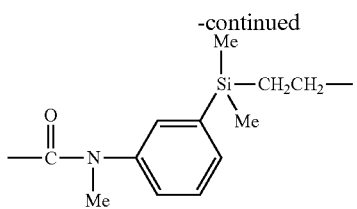

In the afore-mentioned formulas, Z is a divalent to octavalent organopolysiloxane residue having siloxane bonds. Z is preferably a linear or cyclic organopolysiloxane residue having 2 to 13 silicon atoms, preferably 2 to 5 silicon atoms.

Z may contain a silalkylene structure where two silicon atoms are bonded via an alkylene group and which is represented by Si—$(CH_2)_n$—Si wherein n is an integer of from 2 to 6. The present fluorooxyalkylene group-containing polymer has siloxane bonds in the molecule, so that the present surface treatment agent forms a coating which has excellent scrub resistance and scratch resistance.

Preferably, the organopolysiloxane residue has an alkyl group having 1 to 8 carbon atoms, more preferably 1 to 4 carbon atoms, or a phenyl group. The alkylene group in the silalkylene bond preferably has 2 to 6 carbon atoms, more preferably 2 to 4 carbon atoms.

Examples of Z include the following;

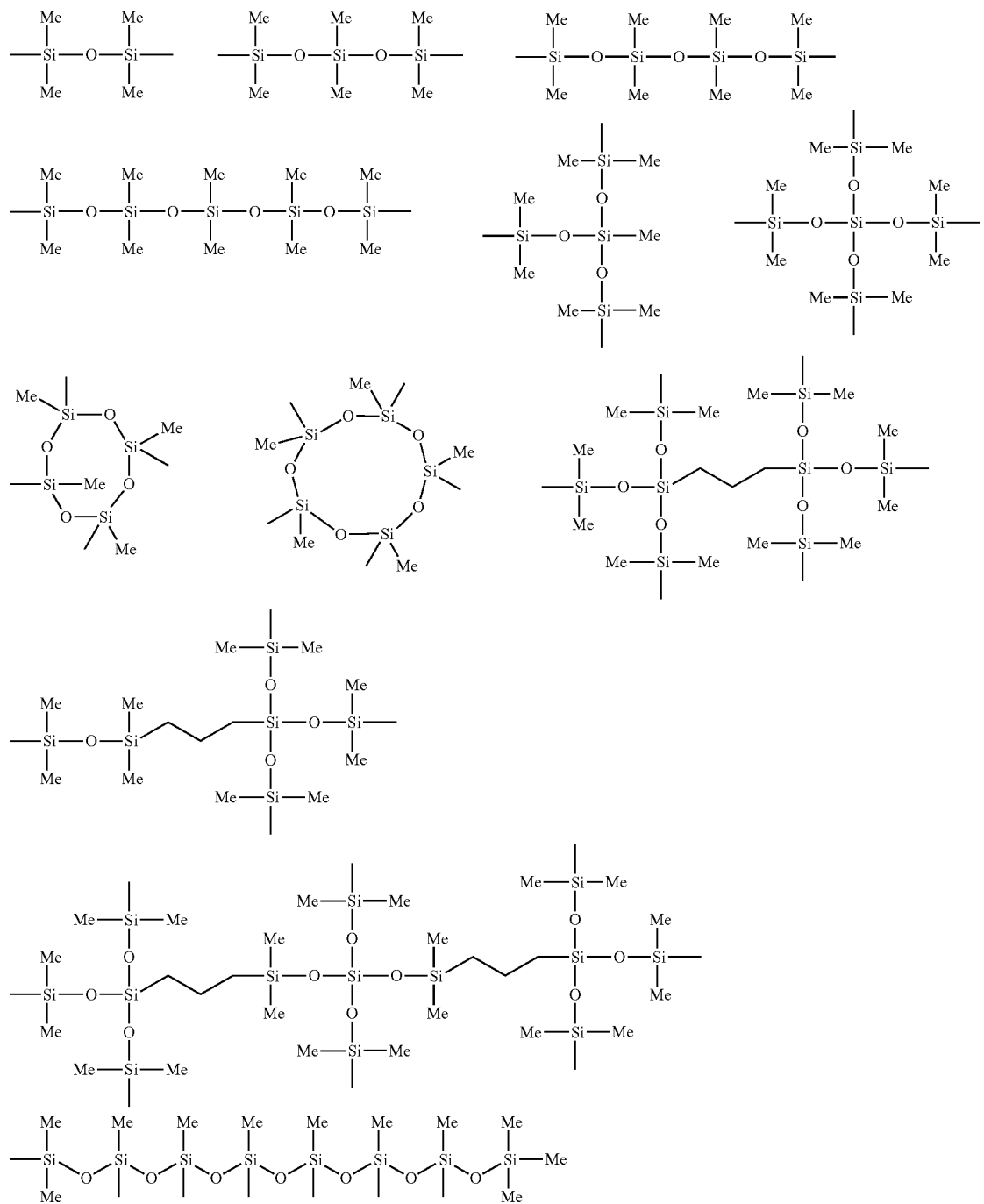

The present surface treatment agent may comprise a product obtained by partial hydrolysis and condensation of the aforesaid fluorooxyalkylene group-containing polymer. The product is obtained by subjecting the terminal hydrolyzable group(s) of the fluorooxyalkylene group-containing polymer to partial hydrolysis and condensation in a conventional manner.

The second aspect of the present invention provides a surface treatment agent comprising the fluorooxyalkylene group-containing polymer composition. The composition comprises a fluorooxyalkylene group-containing polymer having a fluorooxyalkylene structure represented by $—(OCF_2)_p(OCF_2CF_2)_q—$;

wherein p and q are, independently of each other, an integer of from 5 to 80 and a total of p and q is 10 to 100, and these parenthesized units may be sequenced at random; and at least one group represented by the following formula (1) at at least one terminal;

wherein R is an alkyl group having 1 to 4 carbon atoms or a phenyl group, X is a hydrolysable group, a is 2 or 3, and c is an integer of from 1 to 10; and/or _ps a product obtained by partial hydrolysis and condensation of said polymer; and an another polymer represented by the following formula (3), hereinafter called "non-terminal hydrolysable polymer":

wherein Rf is $—(CF_2)_d—(OCF_2)_p(OCF_2CF_2)_q(OCF_2CF_2CF_2)_r(OCF_2CF_2CF_2CF_2)_s—O(CF_2)_d—$, d is an integer of from 0 to 5, p and q are, independently of each other, an integer of from 5 to 80, r and s are, independently of each other, an integer of from 0 to 80, and a total of p, q, r and s is 10 to 100, A is a fluorine atom, a hydrogen atom, or a monovalent fluorinated group having a $—CF_3$ group or a $—CF_2H$ group at a terminal.

The fluorooxyalkylene group-containing polymer is particularly represented by the aforesaid formula (a). It is preferred that the fluorooxyalkylene group-containing polymer is the one-terminal hydrolysable polymer represented by the aforesaid formula (2), the both-terminal hydrolysable polymer represented by the aforesaid formula (4), or a mixture of the one-terminal hydrolysable polymer and the both-terminal hydrolysable polymer. The mixing ratio of the one-terminal hydrolysable and/or both-terminal hydrolysable polymers and the non-terminal hydrolysable polymer is not limited to any particular one, as long as the composition has molecular weight distribution such that when the polymer composition is heated at a rate of 2 degrees C per minute and a pressure of 0.1 Pa or less, the polymer composition shows a decrease of 75% or more, preferably 80% or more, further preferably 90% or more, in weight, relative to the total weight of the polymer composition, in a temperature range of from 150 to 350 degrees C. In particular, the present composition preferably comprises the one-terminal hydrolysable polymer represented by the aforesaid formula (2) as a main component.

The second aspect of the present invention is characterized in that when the fluorooxyalkylene group-containing polymer composition is heated at a rate of 2 degrees C per minute and a pressure of 0.1 Pa or less, the polymer composition shows a decrease of 75% or more, preferably 80% or more, further preferably 90% or more, in weight, relative to the total weight of the polymer composition, in a temperature range of from 150 to 350 degrees C. On account of this characteristic, the present surface treatment agent attains a formation of a coating anytime having good water- and oil-repellency and scratch resistance. A composition having the aforesaid decrease in weight is prepared by rectification or molecular distillation of a mixture of the one-terminal hydrolysable and/or the both-terminal hydrolysable polymers and the non-terminal hydrolysable polymer, and/or a partial hydrolysis and condensation of these polymers. In particular, the molecular distillation is preferred in view of heating process.

In the first and second aspects of the present invention, any molecular distillation apparatus can be used and not limited to any particular one. Examples of the molecular distillation apparatus include pot molecular distillation apparatus, falling film molecular distillation apparatus, centrifugal molecular distillation apparatus, thin-film distillation apparatus and thin-film evaporators. The molecular distillation may be conducted in a vacuum of a pressure of 0.1 Pa or less and a temperature of 100 to 400 degrees C. In particular, it is preferred that the molecular distillation is carried out in a high vacuum at a temperature of from 100 to 300 degrees C to thereby remove low boiling components and, then, at a higher temperature of from 150 to 400 degrees C to thereby remove high boiling components. When the composition has narrow boiling point distribution, either one of the aforesaid steps may be enough. A higher degree of vacuum allows one to obtain a desired product at a relative lower temperature. For instance, the pressure is $1.0 \times 10^{-3}$ to $50 \times 10^{-3}$ Pa.

The surface treatment agent may further comprise a catalyst for hydrolysis and condensation reactions, if needed. Examples of the catalyst include organic tin compounds such as dibutyltin dimethoxide and dibutyltin dilaurate; organic titanium compounds such as tetra-n-butyl titanate; organic acids such as acetic acid, methanesulfonic acid and fluorinated carboxylic acid; and inorganic acids such as hydrochloric acid and sulfuric acid. Among these, preferred are acetic acid, tetra-n-butyl titanate, dibutyltin dilaurate and fluorinated carboxylic acid. A content of the catalyst may be a catalytic amount, which ranges typically from 0.01 to 5 parts by mass, particularly from 0.1 to 1 part by mass, per 100 parts by mass of the fluorooxyalkylene group-containing polymer and/or the product obtained by partial hydrolyzation and condensation of the polymer.

The surface treatment agent may comprise a solvent. Examples of the solvent include fluorinated aliphatic hydrocarbon solvents such as perfluoroheptane and perfluorooctane; fluorinated aromatic hydrocarbon solvents such as m-xylenehexafluoride, bezotrifluoride and 1,3-trifluoromethylbenzene; fluorinated ether solvents such as methyl perfluorobutyl ether, ethyl perfluorobutyl ether, and perfluoro(2-butyltetrahydrofuran); fluorinated alkylamine solvents such as perfluorotributylamine and perfluorotripentylamine; hydrocarbon solvents such as petroleum benzene, mineral spirits, toluene and xylene; ketone solvents such as acetone, methylethylketone and methylisobutylketone. Among these, fluorinated solvents are preferred in view of solubility and wettability of the surface treatment agent. Particularly preferred are 1,3-trifluoromethylbenzene, m-xylenehexafluoride, perfluoro(2-butyltetrahydrofuran), perfluorotributylamine and ethyl perfluorobutyl ether.

A mixture of two or more of the aforesaid solvents may be used. Preferably, the fluorooxyalkylene group-containing polymer and/or the product obtained by partial hydrolyzation and condensation of the polymer are dissolved homogeneously. An optimum concentration of the fluorooxyalkylene group-containing polymer in a solvent may be decided, depending on treatment conditions, and is usually from 0.01 to 30 wt %, preferably from 0.02 to 20 wt %, further preferably from 0.05 to 5 wt %.

The present surface treatment agent may be applied on a substrate by vapor deposition to form a good coating. Examples of a method for the vapor deposition include a resistance heating method and an electronic beam heating method, but are not limited thereto. The present surface treatment agent may be applied on a substrate by brushing, dipping, spraying or spinning. The surface treatment agent may be cured in conditions selected depending on the applying method. When the surface treatment agent is applied by brushing or dipping, a curing temperature is preferably from ambient temperature, i.e. 20 plus or minus 15 degrees C, to 200 degrees C. The curing is carried out preferably in a humid environment to promote the curing reaction. A thickness of a cured coating may be selected depending on the type of a substrate, and is typically from 0.1 nm to 100 nm, particularly from 1 to 20 nm.

A substrate to be treated with the present surface treatment agent may be various substrates, such as paper, cloths, metals and metal oxides, glasses, plastics, ceramics and quartz, but is not limited to these. The present surface treatment agent provides water- and oil-repellency, a low dynamic friction coefficient and scratch resistance to these substrates. In particular, the present surface treatment agent is used suitably for glasses treated with $SiO_2$ and for quartz substrates.

Examples of an article to be treated with the present surface treatment agent include glasses, hard coat films, highly hard films, anti-reflection films, ophthalmic lenses, optical lenses and quartz substrates. In particular, the present surface treatment agent is suitable to form a water- and oil-repellent layer on a surface of tempered glasses and anti-reflection coating glasses.

EXAMPLES

The present invention will be explained in detail by reference to the Examples and the Comparative Examples, but shall not be limited thereto.

A mixture used in the following Synthesis Example 1 comprised 95 mole % of a polymer represented by the following formula (1a) and 5 mole % of a polymer represented by the following formula (1b). The mixture was prepared by partially fluorinating a perfluorooxy compound having carboxylic groups at the both terminals with a fluorine gas. The polymers having carboxylic group(s) were adsorbed on an anion exchange resin and separated and, thereby, the mixing ratio was controlled. The mixing ratio of the polymer in mole % was determined by $^{19}$F-NMR analysis.

  (1a)

  (1b)

(p/q=1.0, a total number of p and q was nearly equal 46)

Synthesis Example 1

50 Grams of the mixture of 95 mole % of the polymer represented by the formula (1a) and 5 mole % of the polymer represented by the formula (1b) was dissolved in a mixed solvent of 40 g of 1,3-trifluoromethylbenzene and 10 g of tetrahydrofuran. 30 Grams of a 40% solution of sodium bis(2-methoxyethoxy)aluminum hydride in toluene was added dropwise to the mixture and stirred at room temperature for 3 hours, to which an appropriate amount of hydrochloric acid was subsequently added and stirred well to make the mixture neutralized and, then, washed with water. A lower phase was taken out and subjected to distillation to remove the solvents to obtain 40 g of a liquid product. According to $^{19}$F-NMR analysis, the product obtained comprised 95 mole % of a polymer represented by the following formula (2a) and 5 mole % of a polymer represented by the following formula (2b).

  (2a)

  (2b)

(p/q=1.0, a total number of p and q was nearly equal 46)

In a reactor, 40 g of the mixture of 95 mole % of the polymer represented by the formula (2a) and 5 mole % of the polymer represented by the formula (2b), 3.5 g of allyl bromide and 0.4 g of tetrabutylammonium hydrogen sulfate were placed and stirred at 50 degrees C for 3 hours. 5.2 Grams of an aqueous 30% sodium hydroxide solution was added dropwise and aged at 55 degrees C for 12 hours. Then, appropriate amounts of PF 5060 and hydrochloric acid were added and stirred, and washed well with water. The lower phase was taken out and subjected to distillation to remove the solvents to obtain 30 g of a liquid product. According to $^{19}$F-NMR and $^{1}$H-NMR analysis, the product obtained comprised 95 mole % of a polymer represented by the following formula (3a) and 5 mole % of a polymer represented by the following formula (3b), hereinafter called "composition A".

  (3a)

  (3b)

(p/q=1.0, a total number of p and q was nearly equal 46)

Synthesis Example 2

Subsequently, 30 g of composition A obtained, 20 g of 1,3-trifluoromethylbenzene, 3 g of trimethoxysilane and 0.1 g of a solution of a chloroplatinic acid/vinyl siloxane complex in toluene, containing $2.5 \times 10^{-8}$ mole of Pt, were mixed and aged at 70 degrees C for 3 hours. Then, the solvent and unreacted compounds were distilled off under a reduced pressure of 533 Pa at 100 degrees C to obtain 25 g of a liquid product. According to $^{1}$H-NMR analysis, the product obtained comprised 95 mole % of a polymer represented by the following formula (1-a) and 5 mole % of a polymer represented by the following formula (1-b), hereinafter called "composition 1-1".

  (1-a)

  (1-b)

(p/q=1.0, a total number of p and q was nearly equal 46)

Composition 1-1 was subjected to molecular distillation at $2 \times 10^{-2}$ Pa and 180 degrees C to thereby remove low boiling components. The composition obtained is hereinafter called "composition 1-2". A recovery ratio was 70%.

Composition 1-1 was subjected to molecular distillation at $2 \times 10^{-2}$ Pa and 320 degrees C to thereby remove high boiling components. The composition obtained is hereinafter called "composition 1-3". A recovery ratio was 80%.

Composition 1-1 was subjected to molecular distillation at $2\times10^{-2}$ Pa and 180 degrees C to thereby remove low boiling components and, then, subjected to further molecular distillation at $2\times10^{-2}$ Pa and 320 degrees C to thereby remove high boiling components. The composition obtained is hereinafter called "composition 1-4". A recovery ratio was 52%.

Synthesis Example 3

Grams of composition A, 20 g of 1,3-trifluoromethylbenzene, 10 g of tetramethylcyclotetrasiloxane and 0.1 g of a solution of a chloroplatinic acid/vinyl siloxane complex in toluene, containing $2.5\times10^{-8}$ mole of Pt, were mixed and aged at 70 degrees C for 3 hours. Then, the solvent and unreacted compounds were distilled off under a reduced pressure. 30 Grams of the mixture obtained, 20 g of 1,3-trifluoromethylbenzene, 3.7 g of allyltrimethoxysilane and 0.1 g of a solution of a chloroplatinic acid/vinyl siloxane complex in toluene, containing $2.5\times10^{-8}$ mole of Pt, were mixed and aged at 70 degrees C for 2 hours. Then, the solvent and unreacted compounds were distilled off under a reduced pressure of 533 Pa at 100 degrees C to obtain 29 g of a mixture comprising 95 mole % of a polymer represented by the following formula (2-a) and 5 mole % of a polymer represented by the following formula (2-b), hereinafter called "composition 2-1".

boiling components and, then, subjected to further molecular distillation at $2\times10^{-2}$ Pa and 330 degrees C to thereby remove high boiling components. The composition obtained is hereinafter called "composition 2-4". A recovery ratio was 42%. 20 [0050]

Synthesis Example 4

30 Grams of composition A, 20 g of 1,3-trifluoromethylbenzene, 8.1 g of (4-dimethylsilylphenyl)dimethylsilane and 0.1 g of a solution of a chloroplatinic acid/vinyl siloxane complex in toluene, containing $2.5\times10^{-8}$ mole of Pt, were mixed and aged at 70 degrees C for 3 hours. Then, the solvent and unreacted compounds were distilled off under a reduced pressure. 30 Grams of the mixture obtained, 20 g of 1,3-trifluoromethylbenzene, 1.5 g of allyltrimethoxysilane and 0.1 g of a solution of a chloroplatinic acid/vinyl siloxane complex in toluene, containing $2.5\times10^{-8}$ mole of Pt, were mixed and aged at 70 degrees C for 2 hours. Then, the solvent and unreacted compounds were distilled off under a reduced pressure of 533 Pa at 100 degrees C to obtain 28 g of a mixture comprising 95 mole % of a polymer represented

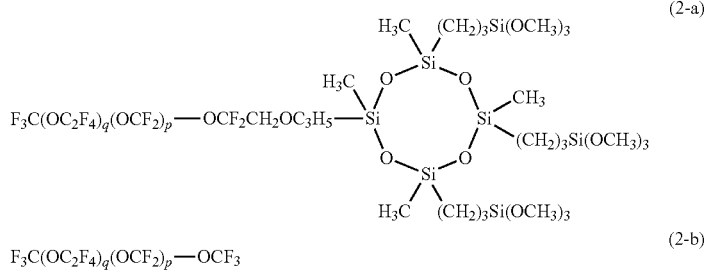

(p/q=1.0, a total number of p and q was nearly equal 46)

Composition 2-1 was subjected to molecular distillation at $2\times10^{-2}$ Pa and 170 degrees C to thereby remove low boiling components. The composition obtained is hereinafter called "composition 2-2". A recovery ratio was 83%.

Composition 2-1 was subjected to molecular distillation at $2\times10^{-2}$ Pa and 330 degrees C to thereby remove high boiling components. The composition obtained is hereinafter called "composition 2-3". A recovery ratio was 71%.

Composition 2-1 was subjected to molecular distillation at $2\times10^{-2}$ Pa and 170 degrees C to thereby remove low by the following formula (3-a) and 5 mole % of a polymer represented by the following formula (3-b), hereinafter called "composition 3-1".

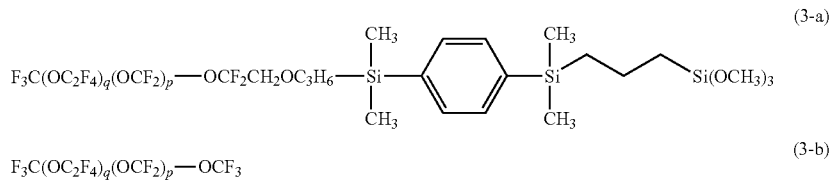

(p/q=1.0, a total number of p and q was nearly equal 46)

Composition 3-1 was subjected to molecular distillation at $2\times10^{-2}$ Pa and 170 degrees C to thereby remove low boiling components. The composition obtained is hereinafter called "composition 3-2". A recovery ratio was 85%.

Composition 3-1 was subjected to molecular distillation at $2\times10^{-2}$ Pa and 330 degrees C to thereby remove high boiling components. The composition obtained is hereinafter called "composition 3-3". A recovery ratio was 75%.

Composition 3-1 was subjected to molecular distillation at $2\times10^{-2}$ Pa and 170 degrees C to thereby remove low boiling components and, then, subjected to further molecular distillation at $2\times10^{-2}$ Pa and 330 degrees C to thereby remove high boiling components. The composition obtained is hereinafter called "composition 3-4". A recovery ratio was 53%.

Synthesis Example 5

A mixture used in the following Synthesis Example 5 comprised 52 mole % of a polymer represented by the following formula (4a), 24 mole % of a polymer represented by the following formula (4b) and 24 mole % of a polymer represented by the following formula (4c). The mixture was prepared by partially fluorinating the perfluorooxy compound having carboxylic groups at the both terminals with a fluorine gas. The polymers having a carboxylic group(s) were adsorbed on an anion exchange resin and separated and, thereby, the mixing ratio was controlled. The mixing ratio of the polymers in mole % was determined by $^{19}$F-NMR analysis.

  (4a)

  (4b)

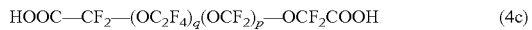  (4c)

(p/q=1.0, a total number of p and q was nearly equal 46)

50 Grams of the mixture of 52 mole % of a polymer represented by the formula (4a), 24 mole % of a polymer represented by the formula (4b) and 24 mole % of a polymer represented by the formula (4c) was dissolved in a mixed solvent of 40 g of 1,3-trifluoromethylbenzene and 10 g of tetrahydrofuran. 30 Grams of a 40% solution of sodium bis(2-methoxyethoxy)aluminum hydride in toluene was added dropwise to the mixture and stirred at room temperature for 3 hours, to which an appropriate amount of hydrochloric acid was subsequently added and stirred well to make the mixture neutralized and, then, washed with water. A lower phase was taken out and subjected to distillation to remove the solvents to obtain 40 g of a liquid product. According to $^{19}$F-NMR analysis, the product obtained comprised 52 mole % of a polymer represented by the following formula (5a), 24 mole % of a polymer represented by the following formula (5b) and 24 mole % of a polymer represented by the following formula (5c).

  (5a)

  (5b)

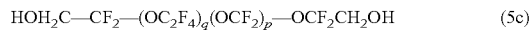  (5c)

(p/q=1.0, a total number of p and q was nearly equal 46)

In a reactor, 40 g of the mixture of 52 mole % of the polymer represented by the formula (5a), 24 mole % of the polymer represented by the formula (5b) and 24 mole % of the polymer represented by the formula (5c), 3.5 g of allyl bromide and 0.4 g of tetrabutylammonium hydrogen sulfate were placed and stirred at 50 degrees C for 3 hours. 5.2 Grams of an aqueous 30% sodium hydroxide solution was added dropwise and aged at 55 degrees C for 12 hours. Then, appropriate amounts of PF 5060 and hydrochloric acid were added and stirred, and washed well with water. A lower phase was taken out and subjected to distillation to remove the solvents to obtain 30 g of a liquid product. According to $^{19}$F-NMR and $^{1}$H-NMR analysis, the product obtained comprised 52 mole % of a polymer represented by the following formula (6a), 24 mole % of a polymer represented by the following formula (6b) and 24 mole % of a polymer represented by the following formula (6c), hereinafter called "composition B", corresponding to the composition described in Example 1 of Japanese Patent Application Laid-Open No. 2011-116947, corresponding to US 2011/098402 A1.

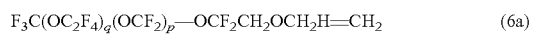  (6a)

  (6b)

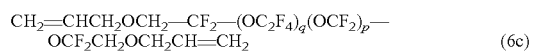  (6c)

(p/q=0.9, a total number of p and q was nearly equal 45)

Synthesis Example 6

Grams of composition B, 20 g of 1,3-trifluoromethylbenzene, 16.2 g of 4-(dimethylsilylphenyl)dimethylsilane and 0.1 g of a solution of a chloroplatinic acid/vinyl siloxane complex in toluene, containing $2.5\times10^{-8}$ mole of Pt, were mixed and aged at 70 degrees C for 3 hours. Then, the solvent and unreacted compounds were distilled off under a reduced pressure of 533 Pa at 100 degrees C. 30 Grams of the mixture obtained, 20 g of 1,3-trifluoromethylbenzene, 3.0 g of allyltrimethoxysilane 16 and 0.1 g of a solution of a chloroplatinic acid/vinyl siloxane complex in toluene, containing $2.5\times10^{-8}$ mole of Pt, were mixed and aged at 70 degrees C for 2 hours. Then, the solvent and unreacted compounds were distilled off under a reduced pressure to obtain 27 g of a mixture comprising 52 mole % of a polymer represented by the following formula (4-a), 24 mole % of a polymer represented by the following formula (4-b) and 24 mole % of a polymer represented by the following formula (4-c), hereinafter called "composition 4-1".

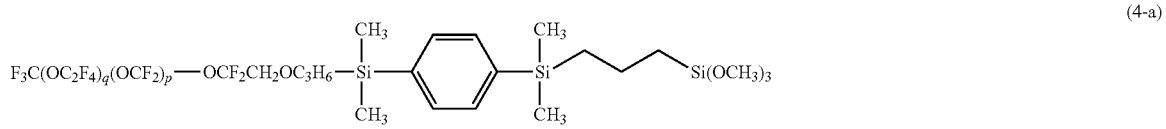  (4-a)

  (4-b)

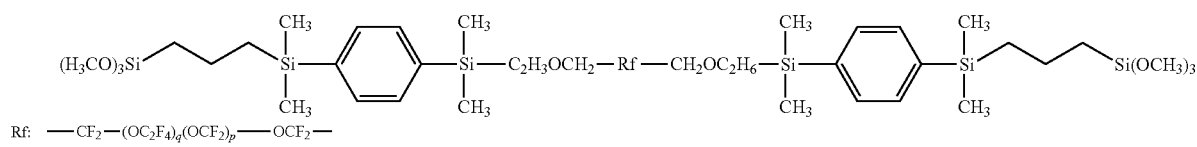

(4-c)

Rf: —CF$_2$—(OC$_2$F$_4$)$_q$(OCF$_2$)$_p$—OCF$_2$—

(p/q=0.9, a total number of p and q was nearly equal 45)

Composition 4-1 was subjected to molecular distillation at 2×10$^{-2}$ Pa and 180 degrees C to thereby remove low boiling components. The composition obtained is hereinafter called "composition 4-2". A recovery ratio was 80%.

Composition 4-1 was subjected to molecular distillation at 2×10$^{-2}$ Pa and 320 degrees C to thereby remove high boiling components. The composition obtained is hereinafter called "composition 4-3". A recovery ratio was 70%.

Composition 4-1 was subjected to molecular distillation at 2×10$^{-2}$ Pa and 180 degrees C to thereby remove low boiling components and, then, subjected to further molecular distillation at 2×10$^{-2}$ Pa and 320 degrees C to thereby remove high boiling components. The composition obtained is hereinafter called "composition 4-4". A recovery ratio was 44%.

Decrease in Weight

The each composition was subjected to a thermogravimetry with the following conditions to measure the weight at temperatures of from 25 up to 500 degrees C. A decrease in weight in a temperature range of from 150 to 350 degrees C was calculated. The results are as shown in Table 1.

[Conditions and Apparatus]

Apparatus: Saturation vapor pressure evaluation system VPE-9000SP, ex ULVAC-RIKO, Inc.

Measurement atmosphere: in vacuum, 1.0×10$^{-3}$ to 9.0×10$^{-2}$ Pa

Heating rate: 2 degrees C per minute

Temperature range: 25 to 500 degrees C

TABLE 1

| | Decrease in weight, % |
|---|---|
| Composition 1-1 | 61 |
| Composition 1-2 | 68 |
| Composition 1-3 | 60 |
| Composition 1-4 | 91 |
| Composition 2-1 | 48 |
| Composition 2-2 | 56 |
| Composition 2-3 | 65 |
| Composition 2-4 | 82 |
| Composition 3-1 | 52 |
| Composition 3-2 | 65 |
| Composition 3-3 | 74 |
| Composition 3-4 | 84 |
| Composition 4-1 | 44 |
| Composition 4-2 | 58 |
| Composition 4-3 | 55 |
| Composition 4-4 | 81 |

Preparation of Surface Treatment Agents

Each of compositions 1-1 to 4-4 was dissolved in 1,3-trifluoromethylbenzene in a 20 wt % concentration to obtain a surface treatment agent.

Forming of a Coating by Vapor Deposition at 350 Degrees C

The each surface treatment agent was vacuum vapor deposited on a glass having a size of 50 mm×100 mm, Gorilla2, ex Corning Incorporated, whose upper surface had been vapor deposited with 10 nm of SiO$_2$ in the following conditions, and was left at 40 degrees C and 80% humidity for 2 hours to form a cured coating.

[Conditions and Apparatus]

Apparatus: Small-sized vacuum vapor deposition equipment VPC-250F, ex ULVAC-RIKO, Inc.

Pressure: 2.0×10$^{-3}$ Pa to 3.0×10$^{-2}$ Pa

Temperature of vapor deposition, the highest temperature of a boat: 350 degrees C Distance of vapor deposition: 20 mm Input volume: 10 mg Deposited volume: 10 mg The cured coatings obtained were evaluated on water- and oil-repellency, determined dynamic friction coefficient and evaluated on scrub resistance in the following methods. The results are as shown in Tables 2 to 5.

Evaluation of Water- and Oil-Repellency

Using a contact angle meter, Drop Master, ex Kyowa Interface Science Co., Ltd., contact angles of the cured coatings with water and oleic acid were measured.

Dynamic Friction Coefficient

The dynamic friction coefficient against Bemcot, ex Asahi Kasei, was determined with a surface property test machine, 14FW, ex Shinto Scientific Co., Ltd. in the following conditions.

Contact area: 10 mm×35 mm

Load: 100 g

Scrub Resistance

Using a rubbing tester, ex Shinto Scientific Co., Ltd., the cured coating was scrubbed in the following conditions, and then a contact angle with water was determined. Test environment was 25 degrees C and a humidity of 40%.

1. Scrub Resistance Against a Cloth

Cloth: Bemcot, ex Asahi Kasei Corporation

Scrub distance (one way): 30 mm

Scrub speed: 1800 mm/min

Load: 1 kg/cm$^2$

Number of scrubbing: 50,000 times

2. Scrub Resistance Against an Eraser

Eraser: EB-SNP, ex TOMBOW Co., Ltd.

Scrub distance (one way): 30 mm

Scrub speed: 1800 mm/min

Load: 1 kg/cm$^2$

Number of scrubbing: 10,000 times

3. Scrub Resistance Against Steel Wool

Steel wool: BONSTAR #0000, ex Nippon Steel Wool Co., Ltd.

Scrub distance (one way): 30 mm

Scrub speed: 1800 mm/min

Load: 1 kg/cm$^2$

Number of scrubbing: 5,000 times

TABLE 2

|  | Composition | Decrease in weight, % | Initial values | | | After scrubbed | | |
|---|---|---|---|---|---|---|---|---|
|  |  |  | Water repellency (°) | Oil repellency (°) | Dynamic friction coefficient | Cloth Water repellency (°) | Eraser Water repellency (°) | Steel wool Water repellency (°) |
| Example 1 | 1-4 | 91 | 115 | 74 | 0.03 | 110 | 110 | 106 |
| Comparative Example 1 | 1-1 | 61 | 114 | 72 | 0.04 | 110 | 106 | 92 |
| Comparative Example 2 | 1-2 | 68 | 113 | 73 | 0.03 | 108 | 107 | 85 |
| Comparative Example 3 | 1-3 | 60 | 112 | 72 | 0.03 | 106 | 105 | 91 |

TABLE 3

|  | Composition | Decrease in weight, % | Initial values | | | After scrubbed | | |
|---|---|---|---|---|---|---|---|---|
|  |  |  | Water repellency (°) | Oil repellency (°) | Dynamic friction coefficient | Cloth Water repellency (°) | Eraser Water repellency (°) | Steel wool Water repellency (°) |
| Example 2 | 2-4 | 82 | 114 | 73 | 0.03 | 106 | 108 | 110 |
| Comparative Example 4 | 2-1 | 48 | 112 | 71 | 0.03 | 106 | 107 | 82 |
| Comparative Example 5 | 2-2 | 56 | 112 | 73 | 0.03 | 103 | 104 | 93 |
| Comparative Example 6 | 2-3 | 65 | 113 | 72 | 0.03 | 105 | 102 | 91 |

TABLE 4

|  | Composition | Decrease in weight, % | Initial values | | | After scrubbed | | |
|---|---|---|---|---|---|---|---|---|
|  |  |  | Water repellency (°) | Oil repellency (°) | Dynamic friction coefficient | Cloth Water repellency (°) | Eraser Water repellency (°) | Steel wool Water repellency (°) |
| Example 3 | 3-4 | 84 | 114 | 73 | 0.03 | 110 | 108 | 107 |
| Comparative Example 7 | 3-1 | 52 | 112 | 71 | 0.03 | 107 | 103 | 93 |
| Comparative Example 8 | 3-2 | 65 | 112 | 72 | 0.03 | 106 | 103 | 91 |
| Comparative Example 9 | 3-3 | 74 | 113 | 72 | 0.04 | 104 | 107 | 85 |

TABLE 5

|  | Composition | Decrease in weight, % | Initial values | | | After scrubbed | | |
|---|---|---|---|---|---|---|---|---|
|  |  |  | Water repellency (°) | Oil repellency (°) | Dynamic friction coefficient | Cloth Water repellency (°) | Eraser Water repellency (°) | Steel wool Water repellency (°) |
| Example 4 | 4-4 | 81 | 112 | 72 | 0.03 | 112 | 105 | 101 |
| Comparative Example 10 | 4-1 | 44 | 111 | 71 | 0.04 | 105 | 106 | 65 |
| Comparative Example 11 | 4-2 | 58 | 112 | 71 | 0.04 | 10 | 105 | 75 |
| Comparative Example 12 | 4-3 | 55 | 111 | 71 | 0.04 | 106 | 103 | 81 |

The coatings formed from the surface treatment agents prepared in Comparative Examples 1, 4, 7 and 10, comprising the compositions which were not molecular-distilled, i.e., its molecular distribution was not controlled, which is the same as described in Patent Literatures 1 to 3, showed poor scrub resistance against steel wool. The coatings formed from the surface treatment agents comprising the compositions which showed the smaller decrease in weight than the lower limit of the present invention had poor scrub resistance against steel wool. In contrast, all of the coatings formed from the present surface treatment agents prepared in the Examples 1 to 4 had good scratch resistance.

Forming of a Coating by Vapor Deposition at 700 Degrees C

The each surface treatment agent was vacuum vapor deposited on a glass having a size of 50 mm×100 mm, Gorilla2, ex Corning Incorporated, whose outermost surface had been vapor deposited with 10 nm of $SiO_2$ in the following conditions, and was left at 40 degrees C and 80% humidity for 2 hours to form a cured coating.

[Conditions and Apparatus]
Apparatus: Small-sized vacuum vapor deposition equipment VPC-250F, ex ULVAC-RIKO, Inc.
Pressure: $2.0 \times 10^{-3}$ Pa to $3.0 \times 10^{-2}$ Pa
Temperature of vapor deposition, the highest temperature of a boat: 700 degrees C
Distance of vapor deposition: 20 mm
Input volume: 10 mg
Deposited volume: 10 mg The cured coatings obtained were evaluated in the aforesaid methods. The results are as shown in Tables 6 to 9.

TABLE 6

| | | | Initial values | | | After scrubbed | | |
| | | | | | | Cloth | Eraser | Steel wool |
| | Composition | Decrease in weight, % | Water repellency (°) | Oil repellency (°) | Dynamic friction coefficient | Water repellency (°) | Water repellency (°) | Water repellency (°) |
|---|---|---|---|---|---|---|---|---|
| Example 5 | 1-4 | 91 | 114 | 75 | 0.03 | 112 | 111 | 110 |
| Comparative Example 13 | 1-1 | 61 | 115 | 73 | 0.03 | 109 | 105 | 102 |
| Comparative Example 14 | 1-2 | 68 | 112 | 73 | 0.03 | 107 | 106 | 104 |
| Comparative Example 15 | 1-3 | 60 | 113 | 73 | 0.03 | 105 | 108 | 93 |

TABLE 7

| | | | Initial values | | | After scrubbed | | |
| | | | | | | Cloth | Eraser | Steel wool |
| | Composition | Decrease in weight, % | Water repellency (°) | Oil repellency (°) | Dynamic friction coefficient | Water repellency (°) | Water repellency (°) | Water repellency (°) |
|---|---|---|---|---|---|---|---|---|
| Example 6 | 2-4 | 82 | 115 | 75 | 0.03 | 108 | 109 | 110 |
| Comparative Example 16 | 2-1 | 48 | 114 | 72 | 0.03 | 107 | 108 | 100 |
| Comparative Example 17 | 2-2 | 56 | 113 | 73 | 0.03 | 104 | 104 | 102 |
| Comparative Example 18 | 2-3 | 65 | 112 | 72 | 0.03 | 102 | 103 | 92 |

TABLE 8

| | | | Initial values | | | After scrubbed | | |
| | | | | | | Cloth | Eraser | Steel wool |
| | Composition | Decrease in weight, % | Water repellency (°) | Oil repellency (°) | Dynamic friction coefficient | Water repellency (°) | Water repellency (°) | Water repellency (°) |
|---|---|---|---|---|---|---|---|---|
| Example 7 | 3-4 | 84 | 115 | 74 | 0.03 | 111 | 108 | 111 |
| Comparative Example 19 | 3-1 | 52 | 113 | 72 | 0.03 | 105 | 108 | 105 |
| Comparative Example 20 | 3-2 | 65 | 113 | 73 | 0.03 | 108 | 104 | 108 |
| Comparative Example 21 | 3-3 | 74 | 113 | 73 | 0.03 | 105 | 107 | 94 |

TABLE 9

| | Composition | Decrease in weight, % | Initial values | | | After scrubbed | | |
| | | | Water repellency (°) | Oil repellency (°) | Dynamic friction coefficient | Cloth Water repellency (°) | Eraser Water repellency (°) | Steel wool Water repellency (°) |
|---|---|---|---|---|---|---|---|---|
| Example 8 | 4-4 | 81 | 113 | 73 | 0.03 | 112 | 108 | 110 |
| Comparative Example 22 | 4-1 | 44 | 113 | 78 | 0.03 | 103 | 105 | 97 |
| Comparative Example 23 | 4-2 | 58 | 112 | 73 | 0.03 | 107 | 106 | 98 |
| Comparative Example 24 | 4-3 | 55 | 111 | 71 | 0.04 | 105 | 105 | 88 |

When the composition is vapor deposited at 700 degrees C, the temperature rises quickly, so that even components having a relatively large molecular weight are deposited in an earlier stage. Accordingly, the scrub resistance against steel wool of the coating tends to be better, compared to the coating obtained by a vapor deposition at 350 degrees C. Therefore, even when the surface treatment agent comprises polymers of Comparative Examples, some of the coatings formed by a vapor deposition at 700 degrees C had good scrub resistance against steel wool. However, the scratch resistances of all of the coatings obtained in the Comparative Examples was inferior to those of the coatings obtained from the present surface treatment agents.

When the composition was vapor deposited at 700 degrees C, the temperature rises quickly, so that a flash boiling may occur and the coating obtained tended to be uneven. Therefore, it is preferred to carry out the vapor deposition gradually in mild conditions such as 350 degrees C so as to obtain an even coating.

INDUSTRIAL APPLICABILITY

The present surface treatment agent stably forms a coating having high water- and oil-repellency and scratch resistance regardless of vapor deposition conditions, in particular by a vapor deposition at a mild temperature such as 350 degrees C. In particular, the present surface treatment agent can stably form a high quality coating, compared to conventional surface treatment agents such as described in Patent Literatures 1 to 3. Therefore, the present surface treatment agent is particularly suitable to form a water- and oil-repellent layer on tempered glass and optical articles such as touch panel displays and anti-reflection coating films.

The invention claimed is:

1. A surface treatment agent comprising a fluorooxyalkylene group-containing polymer and/or a product obtained by partial hydrolysis and condensation of the polymer, wherein the fluorooxyalkylene group-containing polymer has a fluorooxyalkylene structure represented by $-(OCF_2)_p(OCF_2CF_2)_q-$;

wherein p and q are, independently of each other, an integer of from 5 to 80 and a total of p and q is 10 to 100, and these parenthesized units may be sequenced at random; and at least one group represented by the following formula (1) at at least one terminal;

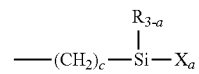

(1)

wherein R is an alkyl group having 1 to 4 carbon atoms or a phenyl group, X is a hydrolysable group, a is 2 or 3, and c is an integer of from 1 to 10;

and shows a decrease of 75% or more in weight, relative to the total weight of the polymer, in a temperature range of from 150 to 350 degrees C. when heated at a rate of 2 degrees C. per minute and a pressure of 0.1 Pa or less.

2. The surface treatment agent according to claim 1, the fluorooxyalkylene group-containing polymer is represented by the following formula (2):

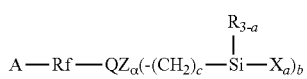

(2)

wherein Rf is $-(CF_2)_d-(OCF_2)_p(OCF_2CF_2)_q(OCF_2CF_2CF_2)_r(OCF_2CF_2CF_2CF_2)_s-O(CF_2)_{d-}$, A is a fluorine atom, a hydrogen atom, or a monovalent fluorinated group having a $-CF_3$ group or a $-CF_2H$ group at a terminal, Q is a divalent organic group, Z is a divalent to octavalent organopolysiloxane residue having siloxane bonds, R, X, a and c are as defined for the aforesaid formula (1), b is an integer of from 1 to 7, α is 0 or 1, d is an integer of from 0 to 5, p and q are, independently of each other, an integer of from 5 to 80, r and s are, independently of each other, an integer of from 0 to 80, and a total of p, q, r and s is 10 to 100, and these parenthesized units may be sequenced at random.

3. A surface treatment agent comprising a fluorooxyalkylene group-containing polymer composition, wherein the composition comprises a fluorooxyalkylene group-containing polymer having a fluorooxyalkylene structure represented by $-(OCF_2)_p(OCF_2CF_2)_{q-}$;

wherein p and q are, independently of each other, an integer of from 5 to 80 and a total of p and q is 10 to 100, and these parenthesized units may be sequenced at random; and at least one group represented by the following formula (1) at at least one terminal;

(1)

wherein R is an alkyl group having 1 to 4 carbon atoms or a phenyl group, X is a hydrolysable group, a is 2 or 3, and c is an integer of from 1 to 10; and/or a product obtained by partial hydrolysis and condensation of said polymer; and an another polymer represented by the following formula (3):

A-Rf-A    (3)

wherein Rf is $-(CF_2)_d-(OCF_2)_p(OCF_2CF_2)_q (OCF_2CF_2CF_2)_r(OCF_2CF_2CF_2CF_2)_s-O(CF_2)_{d^-}$, d is an integer of from 0 to 5, p and q are, independently of each other, an integer of from 5 to 80, r and s are, independently of each other, an integer of from 0 to 80, and a total of p, q, r and s is 10 to 100, A is a fluorine atom, a hydrogen atom, or a monovalent fluorinated group having a $-CF_3$ group or a $-CF_2H$ group at a terminal, and these parenthesized units may be sequenced at random, and shows a decrease of 75% or more in weight, relative to the total weight of the polymer composition, in a temperature range of from 150 to 350 degrees C. when heated at a rate of 2 degrees C. per minute and a pressure of 0.1 Pa or less.

4. The surface treatment agent according to claim 3, wherein the fluorooxyalkylene group-containing polymer is represented by the following formula (2):

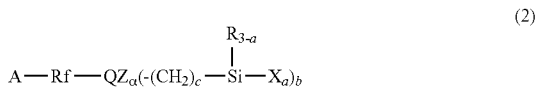
(2)

wherein Rf is $-(CF_2)_d-(OCF_2)_p(OCF_2CF_2)_q (OCF_2CF_2CF_2)_r(OCF_2CF_2CF_2CF_2)_s-O(CF_2)_{d^-}$, A is a fluorine atom, a hydrogen atom, or a monovalent fluorinated group having a $-CF_3$ group or a $-CF_2H$ group at a terminal, Q is a divalent organic group, Z is a divalent to octavalent organopolysiloxane residue having siloxane bonds, R, X, a and c are as defined for the aforesaid formula (1), b is an integer of from 1 to 7, α is 0 or 1, d is an integer of from 0 to 5, p and q are, independently of each other, an integer of from 5 to 80, r and s are, independently of each other, an integer of from 0 to 80, and a total of p, q, r and s is 10 to 100, and these parenthesized units may be sequenced at random; or represented by the following formula (4):

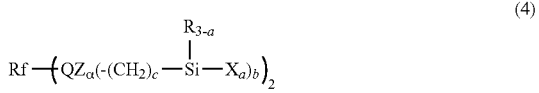
(4)

wherein Rf is $-(CF_2)_d-(OCF_2)_p(OCF_2CF_2)_q (OCF_2CF_2CF_2)_r(OCF_2CF_2CF_2CF_2)_s-O(CF_2)_{d^-}$, and Q, Z, R, X, a, b, c, d, α, p, q, r and s are as defined for said formula (2), or is a mixture of the polymers represented by the formulas (2) and (4).

5. The surface treatment agent according to claim 2 or , wherein Q is a hydrocarbon group having 2 to 12 carbon atoms and may have one or more bonds selected from the group consisting of an amide bond, an ether bond, an ester bond, a silphenylene bond, a silethylene bond and an alkylene bond.

6. The surface treatment agent according to claim 1, further comprising a fluorinated solvent.

7. An article treated by vapor deposition with the surface treatment agent according to claims 1.

8. The article according to claim 7 wherein the article is one selected from a glass, a hard coat film, a highly hard film, an anti-reflection film, an ophthalmic lens, an optical lens and a quartz substrate.

9. The article according to claim 8 wherein the glass is a tempered glass.

10. The article according to claim 8 wherein the glass is an anti-reflection coating glass.

11. A method for preparing the surface treatment agent according to claim 3 wherein the method comprises a step of subjecting a fluorooxyalkylene group-containing polymer composition comprising a fluorooxyalkylene group-containing polymer having at least one group represented by said formula (1) and/or a product obtained by partial hydrolysis and condensation of said polymer and a polymer represented by said formula (3) to molecular distillation at a temperature in a range from 100 to 400 degrees C. to thereby remove low boiling components and/or high boiling components.

12. The surface treatment agent according to claim 1, wherein the fluorooxyalkylene group-containing polymer has one group represented by said formula (1) at at least one terminal.

13. The surface treatment agent according to claim 2, wherein the fluorooxyalkylene group-containing polymer has one group represented by said formula (1) at at least one terminal.

14. The surface treatment agent according to claim 3, wherein the fluorooxyalkylene group-containing polymer has one group represented by the said formula (1) at at least one terminal.

15. The surface treatment agent according to claim 4, wherein the fluorooxyalkylene group-containing polymer has one group represented by said formula (1) at at least one terminal.

16. The surface treatment agent according to claim 1, wherein the fluorooxyalkylene group-containing polymer has more than one group represented by said formula (1) at at least one terminal.

17. The surface treatment agent according to claim 2, wherein the fluorooxyalkylene group-containing polymer has more than one group represented by said formula (1) at at least one terminal.

18. The surface treatment agent according to claim 3, wherein the fluorooxyalkylene group-containing polymer has more than one group represented by said formula (1) at at least one terminal.

19. The surface treatment agent according to claim 4, wherein the fluorooxyalkylene group-containing polymer has more than one group represented by formula (1) at at least one terminal.

* * * * *